Patented May 26, 1942

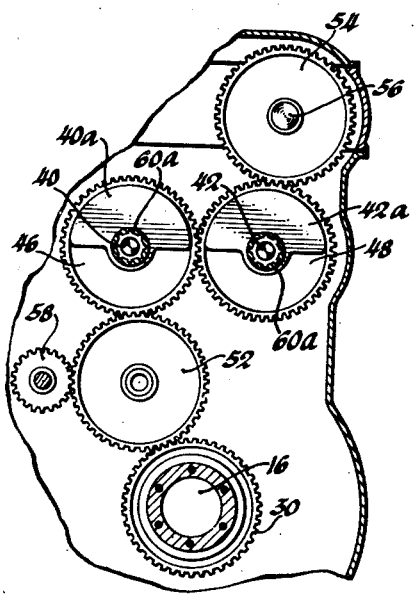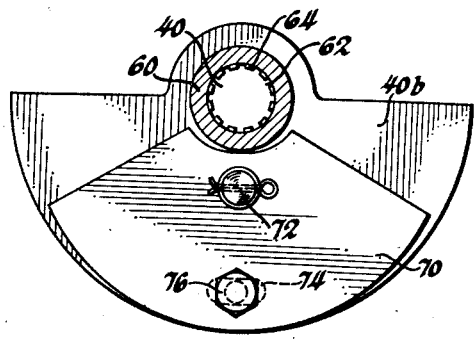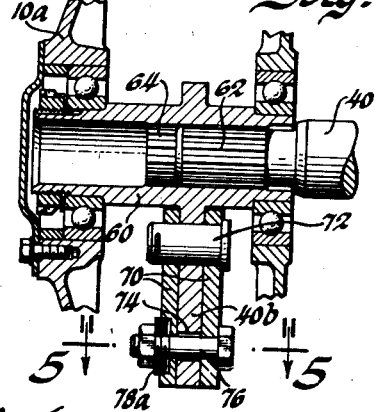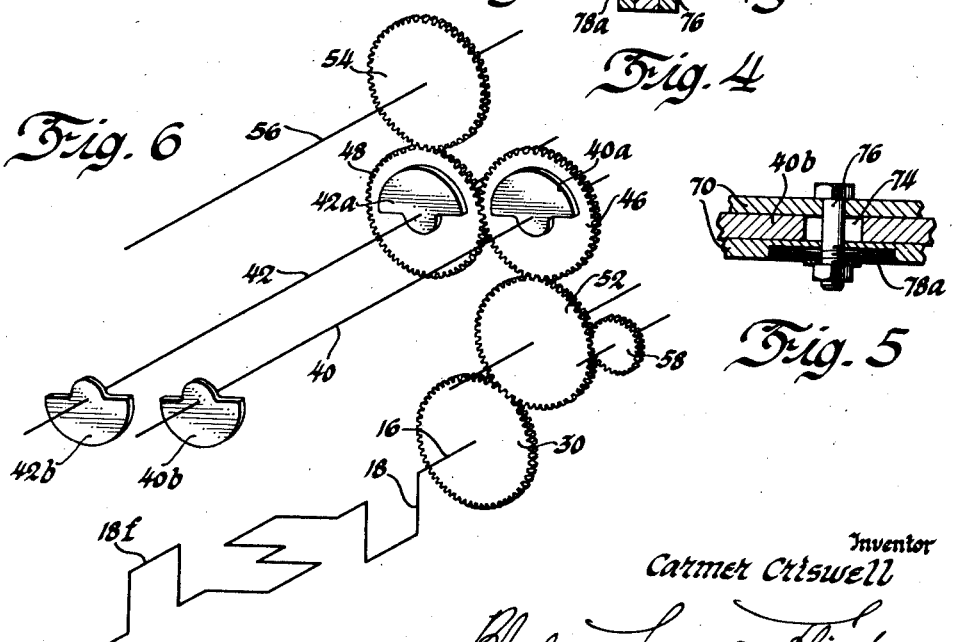

2,284,515

UNITED STATES PATENT OFFICE 2,284,515

VIBRATION SUPPRESSING MEANS

Carmer Criswell, Detroit, Mich., assignor to General Motors Corporation, Detroit, Mich., a corporation of Delaware Original application April 12, 1937, Serial No. 136,392. Divided and this application May 31, 1940, Serial No. 337,980

2 Claims. (Cl. 74—604)

This invention relates primarily to means for suppressing vibrations in internal combustion or other engines and has been divided out of application Serial No. 136,392, filed April 12, 1937, now Patent No. 2,214,921.

The object of the invention is to counteract unbalanced forces that tend to rock the engine and to cause torsional vibrations in the crankshaft and intergeared shafting.

The invention consists of the combination with a multicylinder engine of counterbalancing shafts driven from and parallel with the engine crankshaft and equipped at opposite ends with eccentrically disposed counterweights in different phase relation and means carried on said counterweighted shafts for suppressing torsional vibrations.

In the accompanying drawings in which like reference characters indicate like parts throughout the several views:

Figure 2 is an endwise view of the gearing at the rear end of the engine as seen in section taken on the line 2—2 of Figure 1.

Figure 3 is a section on the line 3—3 of Figure 1 disclosing one of the counterbalancing shafts with vibration damping means attached at the front end.

Figure 4 is a longitudinal sectional view of one of the counterbalancing shafts showing a vibration damper of slightly modified form thereon.

Figure 5 is a detail sectional view on line 5—5 of Figure 4.

Figure 6 is a diagrammatic illustration of an engine crankshaft, parallel counterbalancing shafts, camshafts, and the gear train interconnecting them.

Figure 1:
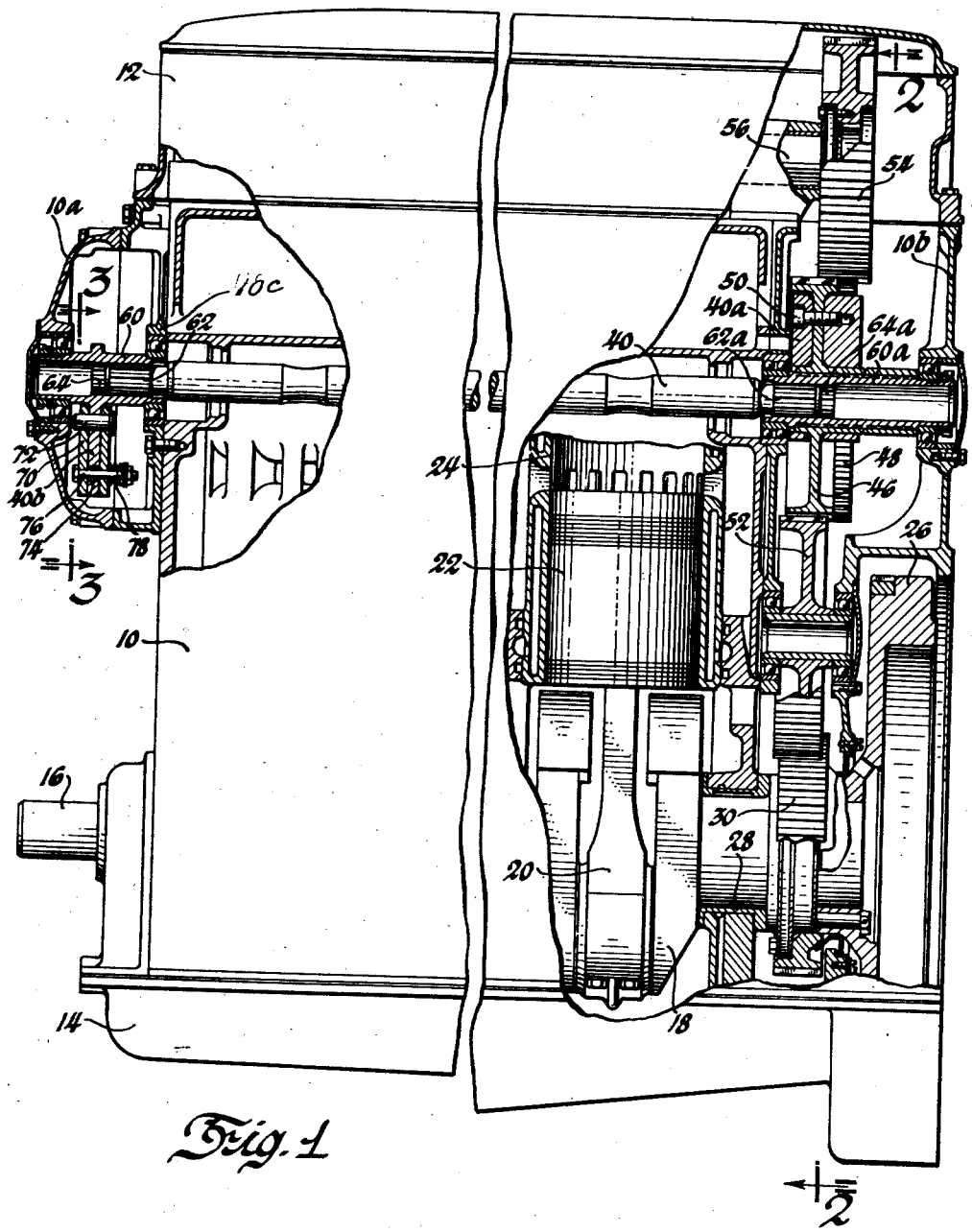
Figure 1 is a side elevation of two end fragments of an engine embodying this invention, the middle part between said fragments having been removed and the engine casing of each fragment broken away so as to reveal engine operating mechanism partly in longitudinal section.

In Figure 1 numeral 10 indicates an upright multicylinder engine frame or block, 12 a top cover member therefor and 14 an oil pan. This figure shows the front and rear end portions of the engine, the mid-portion having been omitted since said mid-portion is not necessary to an understanding of the invention to be disclosed. The engine crankshaft is shown at 16, suitably journalled in the engine frame or block at front and rear. The engine illustrated is a tandem four cylinder, two cycle engine of the Diesel type. This type of engine, however, is merely exemplary since the invention is well adapted to multicylinder engines of other types. One counterweighted crank is shown in Figure 1 at 18. It is to be understood that the crankshaft is counterweighted throughout so as to be in static and dynamic balance. Connecting rod 20 journalled on the crank pin of crank 18 is operatively connected to a piston 22 reciprocating in a cylinder 24. To the rear end of the crankshaft 16 the usual flywheel 26 is attached, as shown, there being a bearing 28 in the engine frame between the crank 18 and said flywheel. Between the flywheel 26 and the bearing 28 there is shown a gear 30 for operating essential parts of the engine and accessories.

In multicylinder engines of this and other types the forces applied to the crankshaft during operation develop a couple tending to oscillate the engine in the plane of the cylinder axes around a transverse axis. In order to counterbalance this rocking couple two shafts are disposed parallel to the axis of the crankshaft. In the embodiment shown counterbalancing shafts 40 and 42 are arranged on opposite sides of the fore and aft center plane of the engine, that includes or is substantially parallel with the cylinder axes. These counterbalancing shafts have at their rear ends eccentrically disposed counterweights 40a and 42a, respectively, and at their front ends other eccentrically disposed counterweights 40b and 42b, the front counterweights being angularly displaced 180° from the rear counterweights. Shafts 40, 42 and crankshaft 16 are geared together so as to rotate at the same velocity and maintain the end crank pins of the crankshaft and the counterweights at the corresponding ends of the counterbalancing shafts always in opposite phase when the crank pins are at top and bottom dead center, as illustrated in the diagrammatic Fig. 6. Counterbalancing shafts 40 and 42 are provided with gears 46 and 48, respectively, secured to their rear ends, and to these gears the counterweights 40a and 42a are conveniently attached, as illustrated. As shown in Figure 1 the counterweight 40a may consist of two eccentrically disposed parts secured to the flange of gear 46 by one or more bolts 50. Counterweight 42a is a duplicate of counterweight 40a. Gear 46 is driven by a gear 52 which meshes with the aforesaid gear 30 on the crankshaft. Gear 48 is shown in this exemplary embodiment as meshing with a gear 54 secured to a valve-operating camshaft 56 arranged longitudinally of the engine within the cover member 12 in the position shown in Figures 1, 2 and 6. One of the counterbalancing shafts may however be utilized as a camshaft if desired. Gear 58, shown meshed with gear 52, operates a blower (not shown) forming a part of the engine charging system but constituting no part of this invention.

The particular engine illustrated has four cylinders and pistons arranged side by side along one side of a four throw crankshaft in which the end throws are 180° apart in the same axial plane and the two intermediate throws are 180° apart in an axial plane 90° from the plane of the end throws. The end cranks and reciprocating pistons and connecting rods tend to produce a couple the forces of which act in a plane parallel to the cylinder axes. These forces tend to rock the engine in a plane, which, in the engine illustrated, is a substantially vertical plane. The shafts 40 and 42 with their counterweights 40a, 42a, 40b and 42b, when the engine is operating, develop couples the combined forces of which are equal in magnitude and opposite in sense to the forces of the couple developed by the rotating crankshaft, the reciprocating masses of the pistons and connecting rods. Inasmuch as the counterweights on the counterbalancing shafts rotate oppositely the centrifugal forces due to the rotation of each pair of counterweights act together as their centers of mass move upward and downward and the forces are added together, while as said centers move inward and outward the forces are subtracted one from another or balance each other, with the result that the counterweights develop only unbalanced forces that are opposite to the unbalanced forces of the reciprocating masses referred to. The mass and disposition on its shaft of each counterweight in order to counterbalance the forces of the reciprocating masses connected to the crankshaft will be selected so that the product of each mass, the radial distance of the center of mass from its center of rotation and the length of the couple arm will balance one-half the force of the opposing couple, the two masses completely balancing the opposing couple. In the drawing the front and rear counterweights on the shafts 40 and 42 are located in transverse planes respectively disposed an equal distance forward and rearward of the forward and rearward cranks of the crankshaft and thus operate with considerable mechanical advantage. Corrective mechanism of the kind illustrated may be applied to other engines having a different number of cylinders in which unbalanced forces tend to impart vibratory movements to the engine or its support. It will be understood different engines may require counterbalancing bodies of different weight and disposition in accordance with the magnitude, direction and sense of the unbalanced forces to be counteracted.

Counterbalancing shafts 40 and 42 have their front ends inserted in tubular extensions 60, as illustrated at the left of Figure 1, and in Figure 4. The front ends of said shafts are reduced and ribbed or splined longitudinally, as shown at 62 on shaft 40. These splined ends interlock with internal splines 64 in said tubular extension so that the latter are non-rotatively coupled with the shafts. The front tubular extensions 60 are journalled, as shown, in ball bearings in a housing part bolted to the front end of the engine frame, said housing consisting of two separable parts 10a and 10c bolted to the engine frame 10 as illustrated in Figure 1.

The rear ends of shafts 40 and 42, as is clearly illustrated with respect to shaft 40 in Figure 1, are likewise provided with tubular extensions 60a internally splined as at 64a to engage the externally splined and reduced ends 62a of said shafts. The rear tubular extensions 60a also are journalled in ball bearings seated in openings in the frame or block 10, and in a rearward housing member 10b.

The gear 46 with its counterweight 40a is secured to the rearward tubular extension 60a of shaft 40 and the gear 48 with its attached counterweight 42a is secured to a corresponding tubular extension at the rear end of shaft 42.

Vibration absorbers to be now described are attached to the forward ends of the counterbalancing shafts 40 and 42.

Reverting now to the tubular extension 60 of shaft 40 it will be seen on reference to Figures 1 and 4 that said tubular extension is formed with or has rigidly fixed to it an eccentric counterweight member 40b displaced angularly 180° from the rear counterweight 40a. This counterweight member 40b is relatively light as compared with the counterweight 40a and the necessary additional mass may consist of a movable counterweight member 70 which in the exemplary form shown is composed of two parts pivotally attached to the counterweight 40b by a pivot pin 72 disposed between the axis of rotation of said counterweight and the center of mass of said member. One half of the movable counterweight member is arranged in contact with one face of the fixed counterweight member 40b and the other half on the opposite face. These faces as shown are plane friction surfaces perpendicular to the axis. Counterweight member 40b is slotted or provided with a suitable opening therethrough located radially outward of the pivotal connection as indicated at 74. Through this opening, in the form of the invention illustrated, is passed a bolt 76 having a head at one end and a nut fitted on the other end, there being a spring 78 (shown in Figure 1 as a coil spring) disposed between the nut and the adjacent half of the damping counterweight member 70.

The fixed counterweight member 40b and the counterweight damping members revolve during operation within the housing attachment 10a, and have counterbalancing effect equal and opposite to that of counterweight 40a.

On the front end of shaft 42, which is parallel with the shaft 40, the counterweight member 42b has a supplemental counterweight and damping member attached to it of the same construction and arrangement as described with respect to the corresponding members on the front end of shaft 40.

The modification illustrated in Figures 4 and 5 involves merely the substitution of a plate spring 78a for a coil spring 78, shown in Figure 1. The plate spring 78a illustrated consists of a plurality of rectangular strips of thin curved spring steel or equivalent.

The particular vibration absorbing device shown and described is claimed in the application of which this is a division.

In operation the rocking couple developed by the primary engine forces operating on the crankshaft will be counterbalanced by the counterweights 40a, 42a at one end and 40b, 42b at the other end of the shafts 40 and 42. These counterweights operate at engine speed, the counterweights 40a and 42a counterbalancing the primary force applied to the rear end of the crankshaft as at crank 18, and the counterweights 40b and 42b counteracting the opposite force applied to the other end of the crankshaft, as at crank 18f, Figure 6. The counter-balancing shafts 40 and 42 are necessarily relatively long and somewhat elastic and have with the added masses therefore a torsional vibration period of their own when excited by torque variations. If not controlled these torsional vibrations will be transmitted to the gears and induce gear noises and gear wear. Such vibrations are also transmitted to the parts operated by the train of gears extending between the crankshaft and the balancing shafts and will affect their operation disadvantageously.

It is therefore important to combine with the crank gearing and couple-counterbalancing means some type of vibration absorbing means attached to the counterbalancing shafts so as to carry the vibration absorbing effort back through the gears to the crankshaft.

I claim:

1. In an engine having a crankshaft subject to forces producing a rocking couple, means for counteracting said forces, said means comprising a counterweighted shaft having a tubular extension keyed thereto, a counterweight carried by said extension, a housing attached to the engine frame, said housing enclosing said counterweight and extension, and bearings in said housing engaging said extension.

2. In an engine having a crankshaft subject to forces producing a rocking couple, means for counteracting said forces, said means comprising a counterweighted shaft having a tubular extension keyed thereto, bearings in spaced parts of the engine frame engaging opposite ends of the extension and a counterweight carried by said extension between the bearings.

CARMER CRISWELL.